US006980325B1

(12) United States Patent
Sugiura et al.

(10) Patent No.: US 6,980,325 B1
(45) Date of Patent: Dec. 27, 2005

(54) AUTOMATED COLOR PROPERTY ADAPTATION IN COMPUTER OUTPUT DEVICES

(75) Inventors: Hiroaki Sugiura, Tokyo (JP); Shuichi Kagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 688 days.

(21) Appl. No.: 09/627,058

(22) Filed: Jul. 27, 2000

Related U.S. Application Data

(63) Continuation-in-part of application No. 09/457,703, filed on Dec. 9, 1999.

(30) Foreign Application Priority Data

| Jan. 27, 1999 | (JP) | ................................ 99/018217 |
| Nov. 16, 1999 | (JP) | ................................ 99/326005 |

(51) Int. Cl.[7] .................... G06F 15/00; G06F 13/00; G09G 5/00
(52) U.S. Cl. .................... 358/1.9; 358/1.15; 345/604
(58) Field of Search .................... 358/1.9, 518, 519, 358/520, 523, 1.15, 539, 500, 296; 382/167, 382/162, 166; 345/90, 604

(56) References Cited

U.S. PATENT DOCUMENTS

| 4,740,833 | A | | 4/1988 | Shiota et al. | |
| 4,841,361 | A | * | 6/1989 | Maysumawa et al. | ...... 358/532 |
| 4,887,150 | A | | 12/1989 | Chiba | |
| 4,989,079 | A | | 1/1991 | Ito | |
| 5,243,447 | A | | 9/1993 | Bodenkamp et al. | ....... 345/629 |
| 5,255,083 | A | | 10/1993 | Capitant et al. | |
| 5,349,452 | A | | 9/1994 | Maeda et al. | |
| 5,359,437 | A | * | 10/1994 | Hibi | ............................ 358/529 |
| 5,436,733 | A | | 7/1995 | Terada et al. | |
| 5,588,050 | A | | 12/1996 | Kagawa | |
| 5,659,406 | A | | 8/1997 | Imao et al. | |
| 5,729,636 | A | | 3/1998 | Kagawa | |
| 5,751,449 | A | | 5/1998 | Nobuta | |
| 5,835,624 | A | * | 11/1998 | Ueda et al. | .................. 382/162 |
| 5,881,168 | A | | 3/1999 | Takaoka et al. | |
| 5,933,252 | A | | 8/1999 | Emori et al. | |
| 5,940,089 | A | | 8/1999 | Dilliplane et al. | .......... 345/553 |

(Continued)

FOREIGN PATENT DOCUMENTS

EP           0665680 A2      8/1995

(Continued)

*Primary Examiner*—Madeleine Nguyen
(74) *Attorney, Agent, or Firm*—Birch, Stewart, Kolasch & Birch, LLP

(57) ABSTRACT

Disclosed are a method (and computer system embodying the method) of displaying original image data that was generated relative to a first color space by an output device that converts image data of a second color space to a visually-perceptible analog thereof. Such a method comprises: receiving from a provider, over a communication channel, original image data that was generated according to a first color space; receiving from the provider, over a communication channel along with the image data, tag data representing parameters of the first color space; the output device automatically converting the original image data into the second color space according to the tag data to produce converted image data; and the output device converting the converted image data into a visually-perceptible analog thereof. Alternatively, the output device can monitor the presence of tag data. If none is received, the output device can presume that the first color space is a default color space, parameters of which are stored in memory. The output device can convert the original image data into the second color space based upon the presumption that the first color space is the default color space.

40 Claims, 7 Drawing Sheets

U.S. PATENT DOCUMENTS

| | | | |
|---|---|---|---|
| 5,987,167 A | 11/1999 | Inoue | 382/167 |
| 6,091,518 A * | 7/2000 | Anabuki | 358/500 |
| 6,177,934 B1 * | 1/2001 | Sugiura et al. | 715/748 |
| 6,260,044 B1 * | 7/2001 | Nagral et al. | 707/102 |
| 6,337,922 B2 * | 1/2002 | Kumada | 382/162 |
| 6,393,545 B1 * | 5/2002 | Long et al. | 712/34 |
| 6,400,467 B1 * | 6/2002 | Harrington | 358/1.9 |
| 6,421,094 B1 | 7/2002 | Han | 348/569 |
| 6,430,311 B1 * | 8/2002 | Kumada | 382/162 |
| 6,434,268 B1 | 8/2002 | Asamura et al. | |
| 6,439,722 B1 * | 8/2002 | Seegers et al. | 351/243 |
| 6,509,910 B1 * | 1/2003 | Agarwal et al. | 345/752 |
| 6,549,654 B1 * | 4/2003 | Kumada | 382/162 |
| 6,628,822 B1 * | 9/2003 | Nakabayashi et al. | 382/162 |
| 6,633,668 B1 * | 10/2003 | Newman | 382/166 |
| 6,693,718 B1 * | 2/2004 | Takaoka | 358/1.15 |
| 6,836,565 B1 * | 12/2004 | Nishikawa | 382/167 |
| 2001/0040689 A1 * | 11/2001 | Uda et al. | 358/1.13 |
| 2002/0012453 A1 * | 1/2002 | Hashimoto et al. | 382/112 |
| 2002/0044150 A1 * | 4/2002 | Sato et al. | 345/600 |

FOREIGN PATENT DOCUMENTS

| | | |
|---|---|---|
| EP | 0 837 601 A2 | 4/1998 |
| EP | 0961481 A2 | 12/1999 |
| JP | 6339188 | 8/1988 |
| JP | 63227181 | 9/1988 |
| JP | 230226 | 7/1990 |
| JP | 548885 | 2/1993 |
| JP | 5-183742 | 7/1993 |
| JP | 7-023245 | 1/1995 |
| JP | 7170404 | 7/1995 |
| JP | 8-321964 | 12/1996 |
| JP | 11-17974 | 1/1999 |
| KR | 10-0244227 B1 | 11/1999 |

* cited by examiner

AUTOMATED COLOR PROPERTY ADAPTATION IN COMPUTER OUTPUT DEVICES

RELATED APPLICATION

This application is a Continuation In Part (CIP) Application of U.S. patent application Ser. No. 09/457,703, filed Dec. 9, 1999, the entirety of which is hereby incorporated by reference.

FIELD OF THE INVENTION

The invention is directed toward outputting image data on an output device, and more particularly to automating color property adaptation for the output device, and more particularly to distributing the computational load for the color property adaptation to the output device.

BACKGROUND OF THE INVENTION

Digital image data can be generated relative to various color spaces, e.g., standard Red Green Blue (sRGB) (standardized by International Electrotechnical Commission (IEC) 61966-2-1), National Television Standards Committee (NTSC), Phase Alteration Line (PAL), SEquential Color And Memory (SECAM), etc. But the color space of the source of the image data is very often not the color space of the output device (such as a monitor, printer, projector, etc.) that converts the image data into a visually perceptible analog thereof. In other words, where the source of the image data operates in a first color space and the output device operates in a second color space, it is usually desirable to convert the image data from the first color space to the second color space before outputting it via the output device.

Typically, the Background Art (such as in FIG. 1) has performed the color space (CS) conversion in the Central Processing Unit (CPU) of a computing device (such as a personal computer), not in the output device. FIG. 1 depicts a block diagram of a personal computer system according to the Background Art.

In FIG. 1, a personal computer (PC) 100 is depicted as including a CPU 102 and an output device 106 connected to the CPU 102 by signal path 114. FIG. 1 also depicts a source of image data 108 connected to the CPU 102 by the signal paths 110 and 112. The CPU 102 has a color space (CS) conversion module 104 that performs the function of converting image data from a first color space to a second color space. Thus, CS conversion module 104 is depicted as the termination point for the signal paths 110 and 112. The output device 106 is depicted as taking the form of a monitor 106A that is a component of the PC or as a printer 106B that is external to the PC. Each of the monitor 106A and the printer 106B is considered external to the CPU 102.

In operation, the image data source 108 provides image data based in the first color space (CS1) and tag data representing parameters of the first color space via signal paths 110 and 112, respectively, to the CS conversion module 104 within the CPU 104 of the PC 102. Then, the CS conversion module 104 automatically converts the image data from the first color space to the second color space (CS2) according to the tag data for the first color space. And then the CS conversion module 104 outputs the image data based in the second color space to the output device 106 via the signal path 114.

It is noted that separate signal paths 110 and 112 for the image data and the associated tag data, respectively, have been depicted to emphasize that tag data is transferred to the CPU 102, while, in contrast, only CS2 image data is transferred out of the CPU 102 over the signal path 114. But it is not necessary that the image data and tag data be transmitted over two separate paths.

The CS conversion module 104 is typically implemented as software being run by the CPU 102. As such, the conversion speed of the software is limited by the system clock speed of the CPU 102. This raises the problem that the CPU, in general, cannot convert moving picture images (e.g., 100 million pixels per second) fast enough so that the moving pictures can be displayed on the output device (here, the monitor 106A) in real time.

The PC 100 of FIG. 1 has another problem. Suppose that it has to drive a second output device (not depicted), e.g., a liquid crystal display (LCD) projector, which is a typical requirement of a laptop PC. If the color space of the second output device is different than the color space (CS3) of the monitor 106A, the color conversion module 104 will attempt to convert the original image data from the source 108 into both CS2 image data and CS3 image data concurrently. For all but the smallest of image data sets, this represents a computational load that cannot be serviced in real time by the CS conversion module 104, i.e., the CPU 102. As a result, the monitor 106A and the second monitor cannot display the same image concurrently in real time.

As represented by a computer monitor (not depicted) marketed by the MITSUBISHI ELECTRIC CORPORATION ("Mitsubishi Denki"), Model No. LXA580W, it is known in the Background Art to locate non-automatic color conversion functionality in an output device. Such a monitor includes a memory containing conversion circuitry to convert input image data from one of a plurality of color spaces into the color space of the monitor.

A viewer/user of the Background Art monitor marketed by Mitsubishi Denki can manipulate a dedicated interface on the front of the monitor case to select one of the plurality of color spaces. Processing circuitry within the monitor accordingly will treat the input image data as if it has been generated within the selected color space. The processing circuitry will convert the input image data from the selected color space into the color space of the monitor. Then, the converted image data is displayed. The viewer/user views the displayed data to decide if its appearance is acceptable. Through trial and error, the conversion resulting in the best display appearance (according to the viewer's/user's personal preferences) can be selected.

The Background Art monitor marketed by Mitsubishi Denki has the advantage of providing enhanced quality of the displayed image. But it has the disadvantage that the user/viewer must actively participate in the optimization process each time data from a different color space is to be displayed.

SUMMARY OF THE INVENTION

The invention, in part, provides a method (and computer system embodying the method) of displaying original image data that was generated relative to a first color space by an output device that converts image data of a second color space to a visually-perceptible analog thereof. Such a method comprises: receiving from a provider, over a communication channel, original image data that was generated according to a first color space; receiving from the provider, over a communication channel along with the image data, tag data representing parameters of the first color space; the output device automatically converting the original image data into the second color space according to the tag data to produce converted image data; and the output device converting the converted image data into a visually-perceptible analog thereof.

The invention, also in part, provides a method (and computer system embodying the method) of displaying original image data that was generated relative to a first color space by an output device that converts image data of a second color space to a visually-perceptible analog thereof. Such a method comprises: receiving from a provider, over a communication channel, original image data that was generated according to a first color space; monitoring the presence of tag data, representing parameters of a color space, over the communication channel along with the image data; presuming, if no tag data is received over the communication channel, that the first color space is a default color space; the output device converting the original image data into the second color space based upon the presumption that the first color space is the default color space to produce converted image data; and the output device converting the converted image data into a visually-perceptible analog thereof. As an example, the default color space can be sRGB.

The invention, also in part, provides that the data provider can be a computing device and the communication channel can be a direct connection between the computing device and the output device, or that the provider can be a memory device and the communication channel can be a direct connection between the memory device and the output device, or that the provider can be a server and the communication channel can be a network to which the output device is connected. Alternatively, the invention provides that the output device can be a component of a personal computing device connected to the network, and such a network connection can be wireless.

The invention, also in part, provides that the provider receives the original image data from a source, e.g., a scanner, a digital camera or a signal generator, and that the output device can be a monitor, a projector or a printer.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

The drawings are not drawn to scale.

DETAILED DESCRIPTION OF THE PREFERRED EMBODIMENTS

Figure 2A:
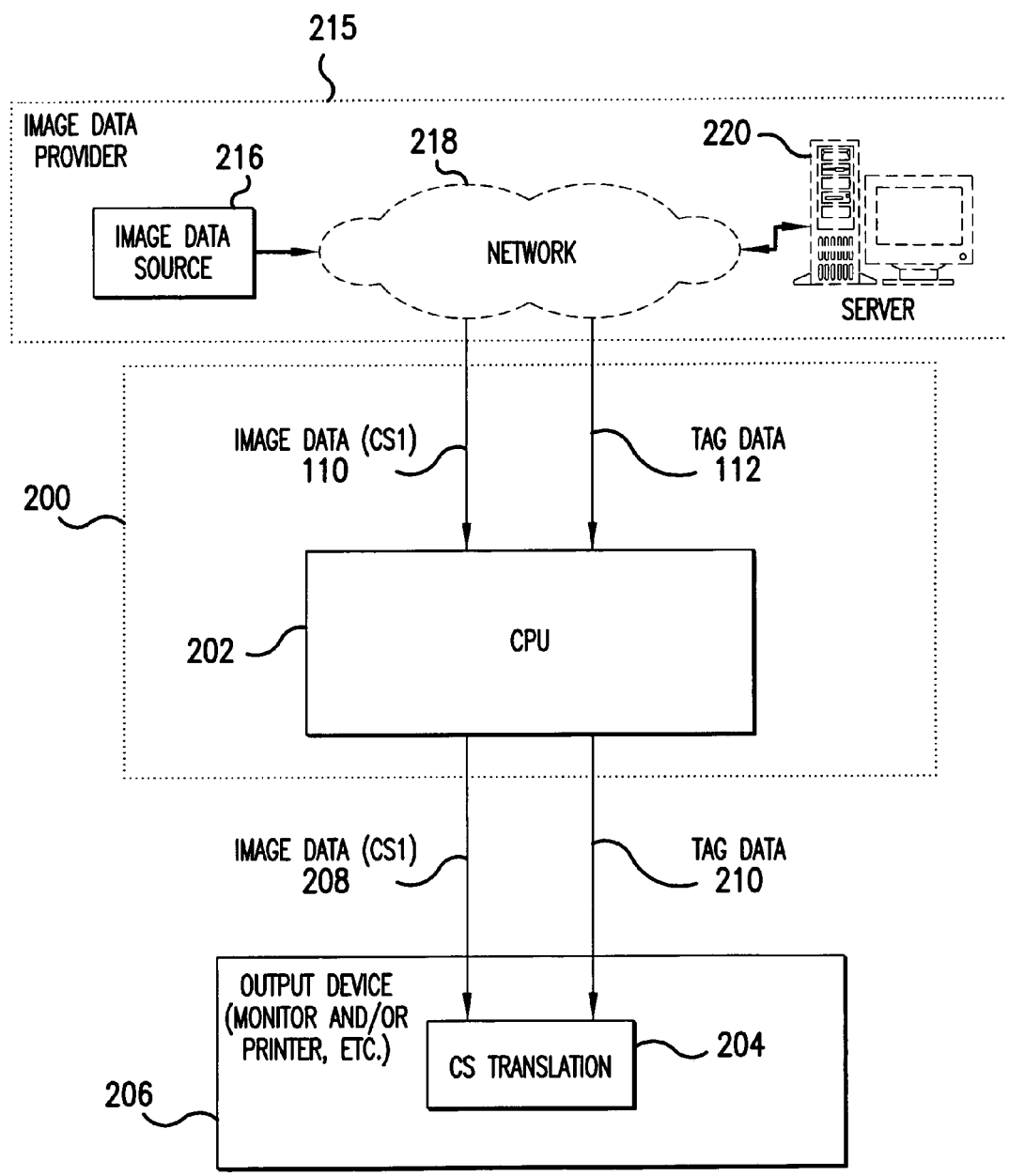
FIGS. 2A and B depict a block diagram of a first embodiment of a computer system according to the invention.

FIGS. 2A and B depict a block diagram of a first embodiment of a computer system according to the invention. In FIGS. 2A and B, a computing device, such as a personal computer (PC) 200, includes a CPU 202 and an output device 206. FIGS. 2A and B also depict an image data provider 215 that includes a source 108 of image data, optionally connected to the CPU 202 via a network 218 run by a server 220 (the network 218 and the server 220 being drawn in dashed lines to denote their optional status). The source 108 of image data can be, e.g., a scanner, a digital camera or a signal generator (such as paint, photo, graphics or animation software).

The image data provider 215 is connected to the CPU 202 via signal paths 110 and 112. The CPU 202 is connected to the CS conversion module 204 via signal paths 208 and 210.

Figure 1:
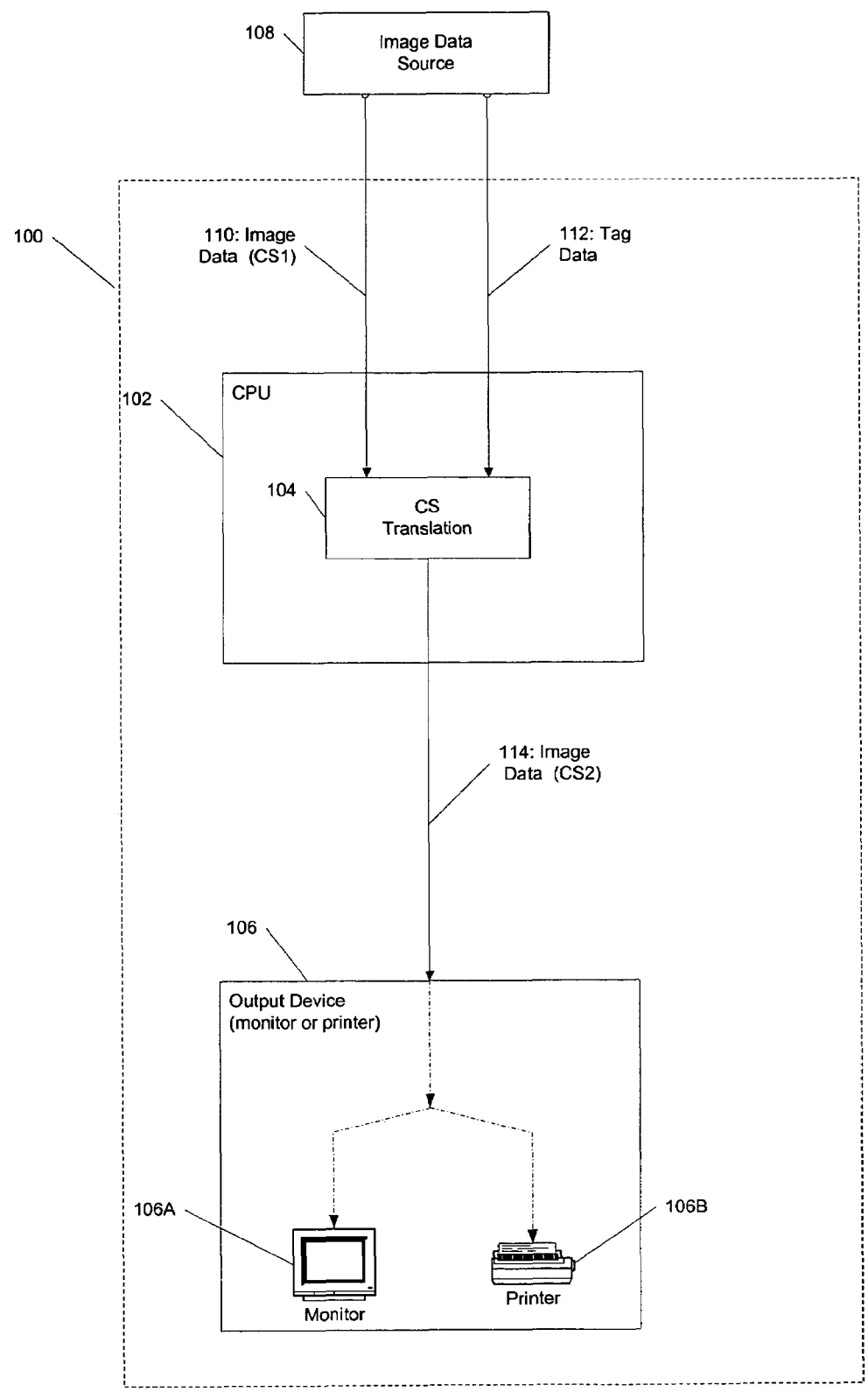
FIG. 1 depicts a block diagram of a personal computer system according to the Background Art.

The output device 206, not the CPU 202 (as in the Background Art of FIG. 1), has a color space (CS) conversion module 204 that performs the function of converting image data from a first color space to a second color space. The CS conversion module 204 corresponds to the CS conversion module 506 of FIG. 5 (which is depicted in more detail); the CS conversion module 506 is discussed in more detail below.

Figure 2B:
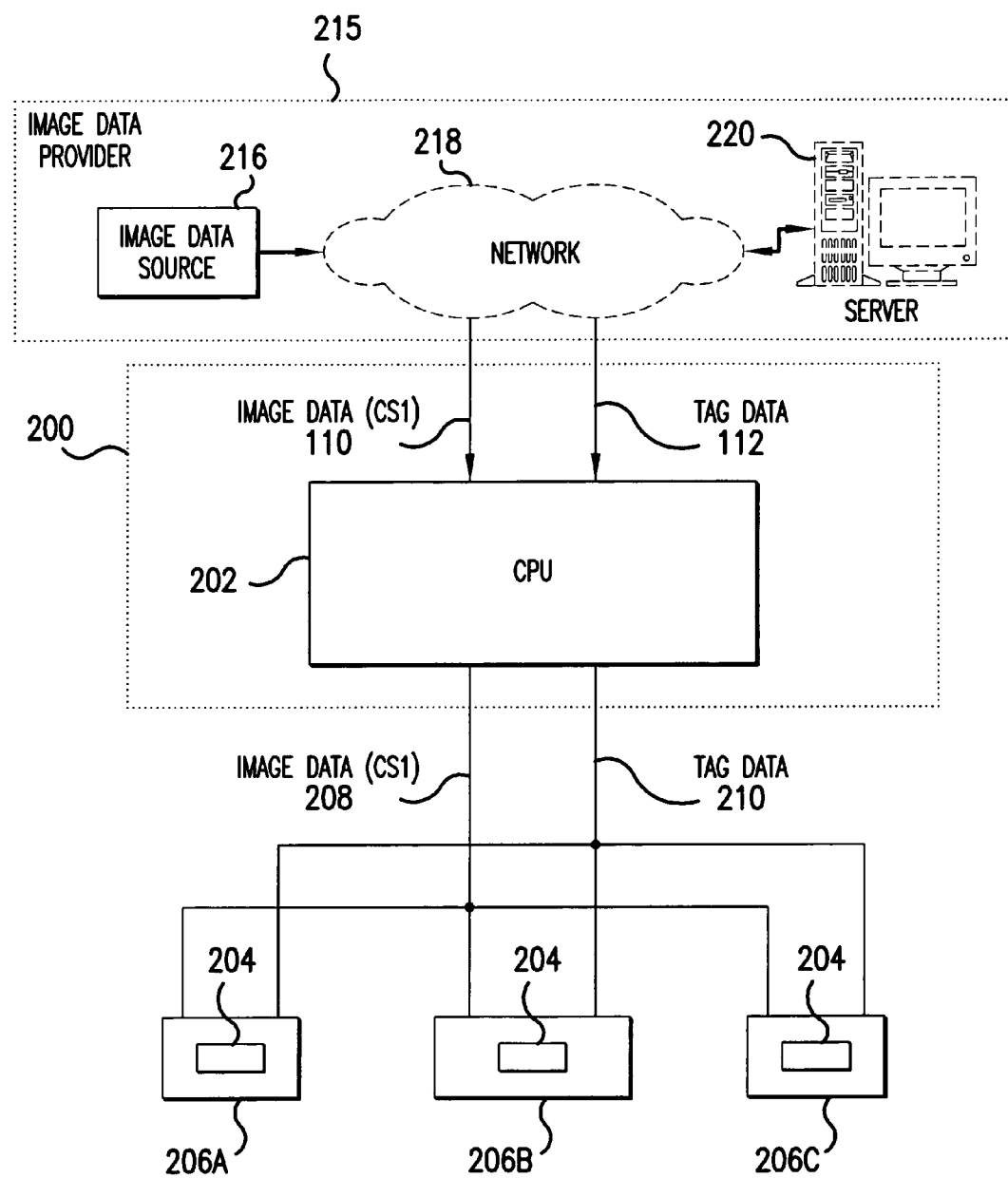

The output device 206 is depicted as including a converter to convert image data into a visually-perceptible analog thereof, such as a monitor 206A, a printer 206B, or projector 206C, as shown in FIG. 2B.

Each of the monitor 206A and the printer 206B, as well as the CS conversion module 204, are considered external to the CPU 202. The monitor 206A can be a cathode ray tube (CRT), a liquid crystal display (LCD) device, a plasma display panel (PDP), an LCD project, etc. The printer 206B can be a laser printer, an ink jet printer, a dot matrix printer, a thermal printer, a plotter, etc.

Separate signal paths 208 and 210 for the image data and the associated tag data, respectively, have been depicted to emphasize that the tag data is transferred to the CS translation module 204. Similar conventions have been employed in the other figures. But it is not necessary that the image data and tag data be transmitted over two separate paths. Rather, the number of signal paths will depend upon the application in which the invention is employed.

Figure 3:
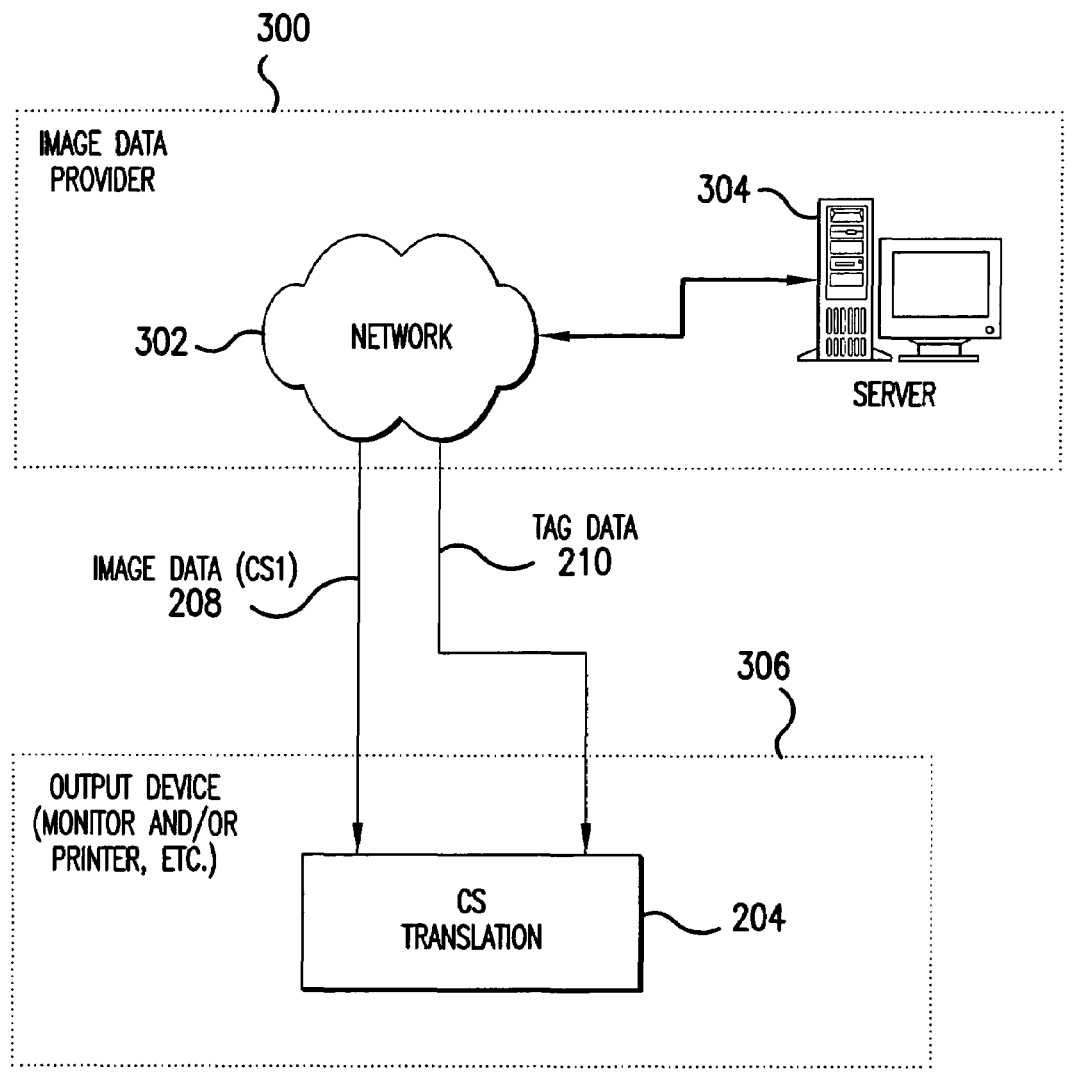
FIG. 3 depicts a block diagram of a second embodiment of a computer system according to the invention.

FIG. 3 depicts a block diagram of a second embodiment of a computer system according to the invention. The differences between FIG. 3 and FIGS. 2A and B will be emphasized. In FIG. 3, the image data provider 300 can be a network 302 run by a server 304. A network-compatible output device 306, having a CS conversion module 204, is connected to the network 302 via the signal paths 208 and 210.

Figure 4:
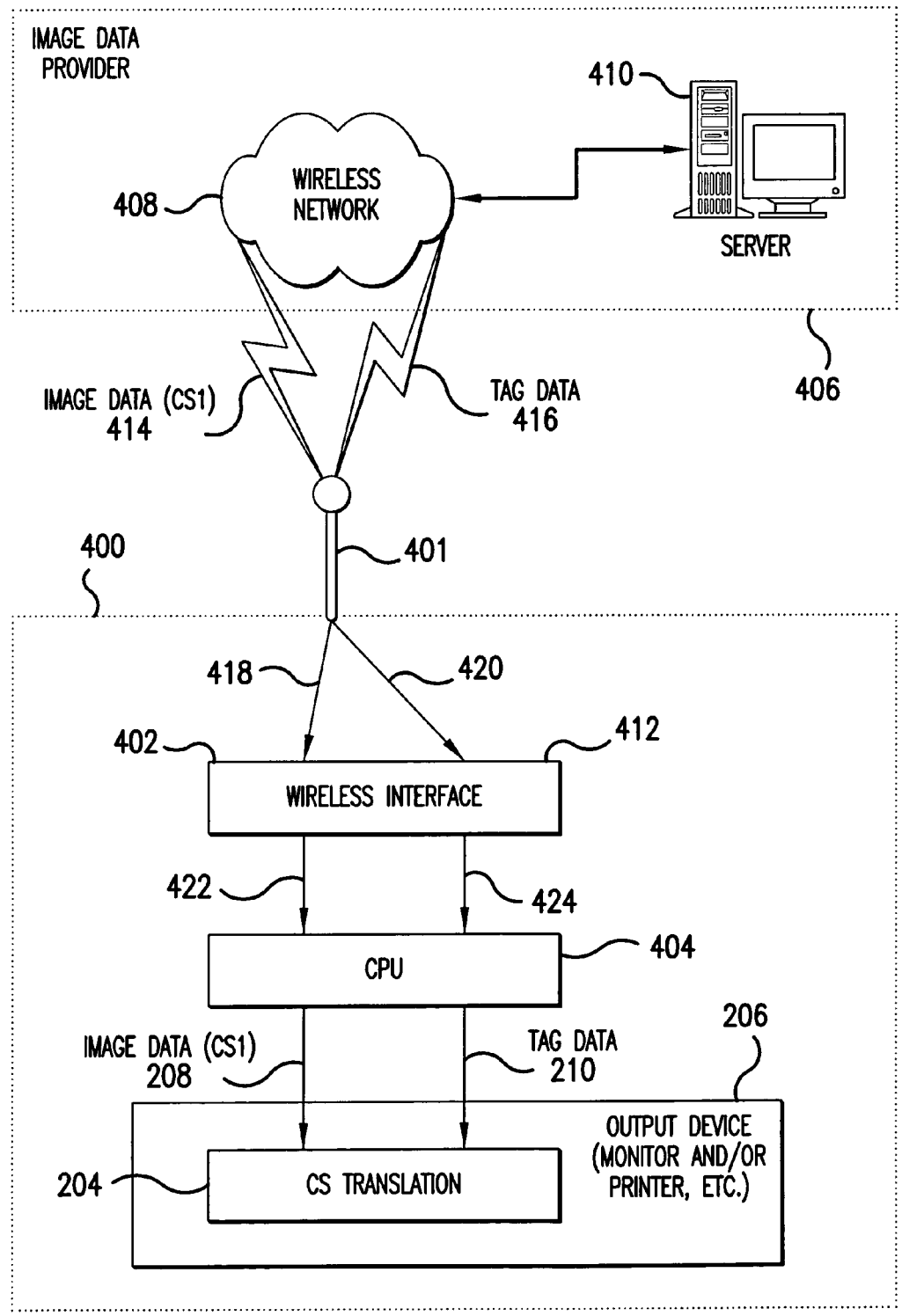
FIG. 4 depicts a block diagram of a third embodiment of a computer system according to the invention.

FIG. 4 depicts a block diagram of a third embodiment of a computer system according to the invention. The differences between FIG. 4 and FIG. 2 will be emphasized. In FIG. 4, the image data provider 406 can be a wireless network 408 run by a server 410. And the computing device 400 (e.g., a personal data assistant (PDA)) includes an antenna 401, a wireless interface 402 and a CPU 404.

In FIG. 4, the antenna 401 of the computing device 400 is connected to the image data provider 406 via the wireless signal paths 414 and 416. The wireless interface 402 is connected to the antenna 401 via the signal paths 418 and 420. The wireless interface 402 is connected to the CPU via the signal paths 422 and 424. The CPU 404 is connected to the CS conversion unit 204 via the signal paths 208 and 210.

Figure 5:
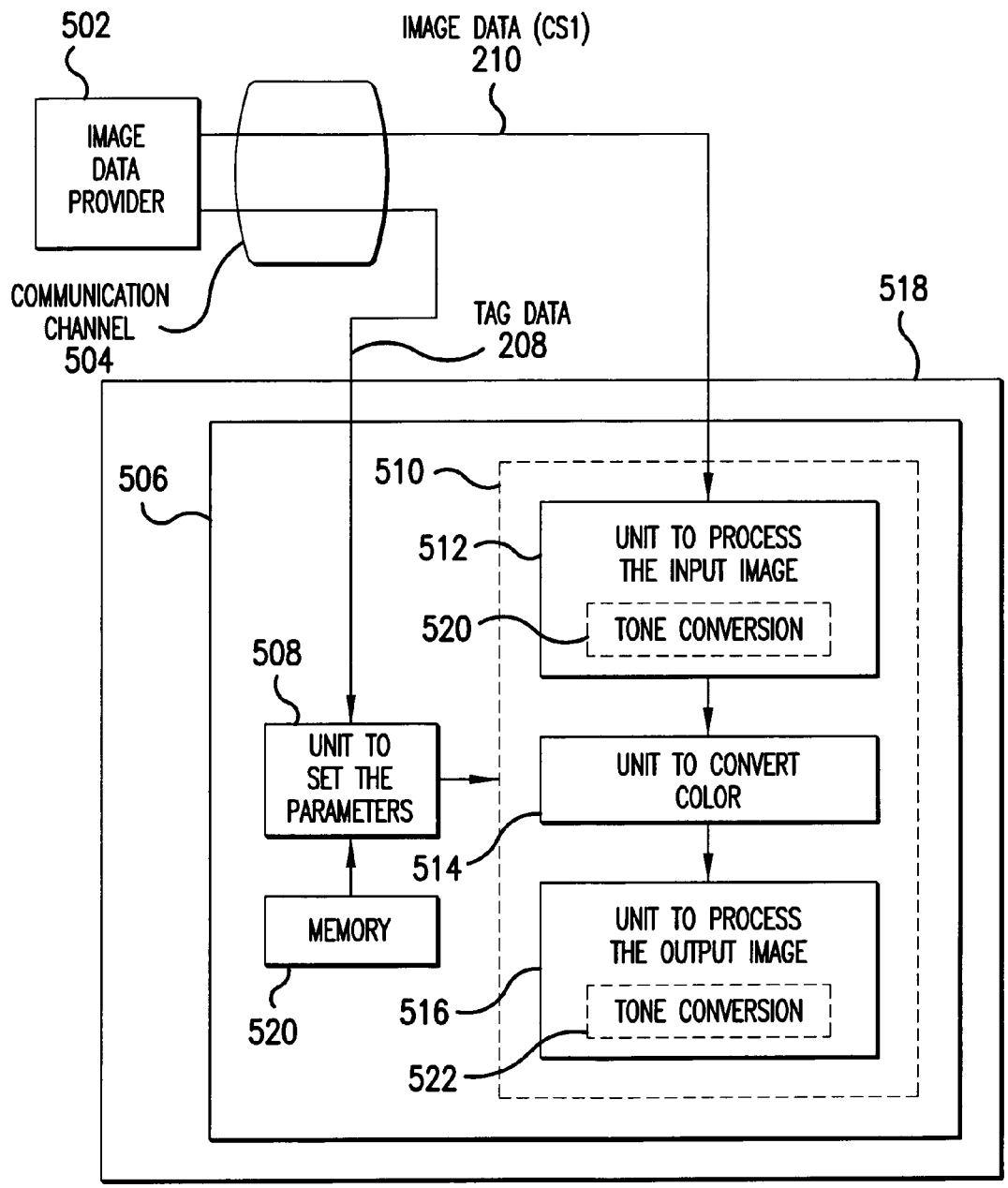
FIG. 5 depicts a color conversion module according to the invention in more detail.

FIG. 5 depicts, in more detail, a CS conversion module 506 according to the invention. The CS conversion module 506, which is provided in the output device 518, corresponds to the CS conversion module 204. In FIG. 5, an image data provider 502 is connected to the CS conversion module 506 via a communication channel 504 through which travel signal paths 208 and 210.

The CS conversion module 506 includes a unit 510 to process the image data. The CS conversion module also includes unit 508 to set the parameters for the processing unit 510 and an optional memory device 522 (denoted by depiction in dashed lines), e.g., a ROM, connected to the unit 508. The processing unit 510 includes: a unit 512 to process the input image; a unit 514 to convert the color of the input image data; and a unit 516 to process the output. The unit 512 includes a tone conversion module 520 to manipulate the tone of the input image. The unit 516 includes a tone conversion module 522 to manipulate the tone of the output image.

The units 508, 512, 514, and 516 are preferably hardware devices such as Programmable Logic Arrays (PLAs) or Application Specific Integrated Circuits (ASICs). And the units 508, 512, 514, and 516 are the subject of the following copending patent applications, the contents of each of which is hereby incorporated by reference: unit 508 is the subject of Japanese Patent Application Nos. Heisei 11-291896, Heisei 11-291897, Heisei 11-349716 and Heisei 11-349717; unit 512 is the subject of Japanese Patent Application Nos. Heisei 11-291892 and Heisei 11-291894; unit 514 is the subject of the parent of the parent to this case, namely U.S. patent application Ser. No. 09/457,703; and unit 516 is the subject of Japanese Patent Application Nos. Heisei 11-291893 and Heisei 11-291895.

Tag data representing parameters of a color space can take many forms, depending upon the particular details of the units 508, 510, 512, 514 and 516. Some examples of tag data follow. Tag data can be a code (e.g., 3 bits in length) identifying a type of color space such as sRGB, NTSC, PAL, SECAM, a proprietary standard used by a manufacturer of image generating equipment, etc. Tag data can be primaries' coordinates, e.g., R: (x, y)=(0.640, 0.330), G: (x, y)=(0.300, 0.600), B: (x, y)=(0.150, 0.060); or W: (x, y)=(0.3127, 0.3290), x, y: CIE (Commission Internationale de I'Eclairage) chromaticity coordinate.

Tag data can be tone characteristics, e.g., a gamma value such as gamma=1.8 or 2.2 or 2.6. Tag data can be a table of values for tone conversion, e.g., that describe a relationship between input signal level and output signal level, such as

| input  | 0.0 | 0.1  | 0.2  | . . . | 0.9  | 1.0  |
|--------|-----|------|------|-------|------|------|
| output | 0.0 | 0.01 | 0.04 | . . . | 0.81 | 1.00 |

Tag data can also be a combination of primaries' coordinates and tone characteristics.

Tag data can be color reproduction characteristics related to human perception, e.g.: RGB signal values for specific colors such as: Red, R=1.0, G=0.1, B=0.0; or Hue (similar to color phase), Chroma (similar to saturation), and Value (similar to brightness) coordinates for specific colors such as, in the case of absolute values, Red—Hue=5, Chroma=4, Value=14, or the case of relative values, Red—delta_H=0.1, delta_C=−0.01, delta_V=0.0. Tag data can also be parameters for processing unit 510, especially the tone conversion unit 520, the color conversion unit 514 and the tone conversion unit 522.

It is noted that the order of discussing the various forms of tag data also indicates a relative increase in the size of memory needed to store the tag data.

Figure 6:
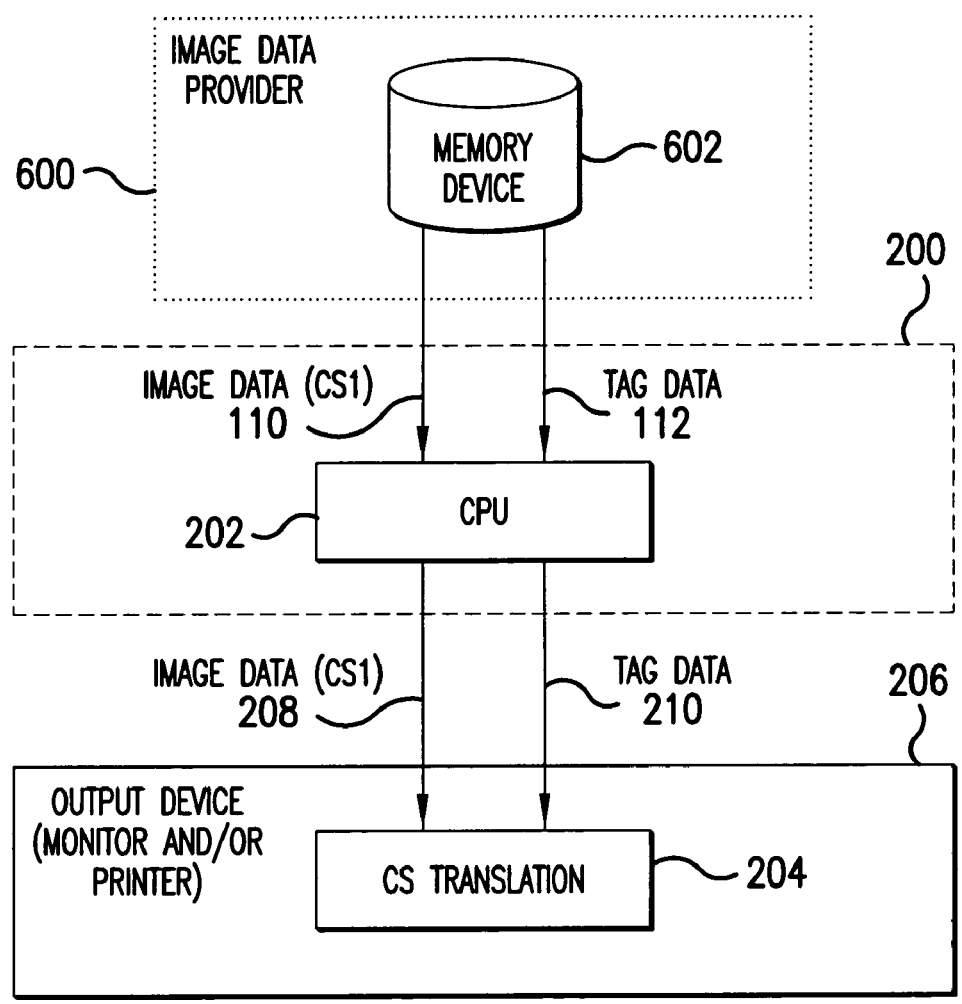
FIG. 6 depicts a block diagram of a fourth embodiment of a computer system according to the invention.

FIG. 6 depicts a block diagram of a fourth embodiment of a computer system according to the invention. The differences between FIG. 6 and FIGS. 2A and B will be emphasized. In FIG. 6, the image data provider 600 can be a memory device 602 such as a Personal Computer Miniature Communications Interface Adapter (PCMCIA) memory card, a disk drive device or other memory device. The image data provider is connected to the CPU 202 via the signal paths 110 and 112. Again, the CPU 202 is connected to the CS conversion module 204 via the signal paths 208 and 210 while the CS conversion module is connected to the converter 206A and/or 206B via the signal path 214.

The operation of the various embodiments will now be discussed.

In FIGS. 2A and B, the image data provider 215 provides image data based in a first color space (CS1) and tag data representing parameters of the first color space via signal paths 110 and 112, respectively, to the CPU 202 of the PC 200. The CPU 202 transmits the CS1 image data and the tag data, without conversion (in contrast to Background Art FIG. 1), to the CS conversion module 204 within the output device 206 via signal paths 208 and 210, respectively. Then, the CS conversion module 204 automatically converts the CS1 image data from the first color space to the second color space (CS2), namely that of the converter 206A and/or 206B, according to the tag data for the first color space.

Each of the monitor 206A and the printer 206B has its own CS conversion unit 204A and 204B, respectively (as shown in FIG. 2B). Similarly, if another output device 206i is provided (not depicted), it too will have its own CS conversion module 204i.

Similarly, in FIG. 5, the CS conversion module 506 automatically converts the CS1 image data from the image data provider 502 to the second color space (CS2) of the output device 518 according to the tag data for the first color space. For a more detailed description of the operations of the units 508, 510, 512, 514, and 516, the reader is generally referred to the copending applications that have been incorporated by reference above.

An alternative implementation of the CS conversion module 204 is indicated with the optional memory device 522 depicted in the corresponding CS conversion module 506 of FIG. 5. In this alternative implementation, the unit 508 (for setting parameters) monitors the signal path 210 for tag data. If none is received within a predetermined time relative to the transmission of the image data over the signal path 208, then the unit 508 presumes that the color space of the image data corresponds to a default color space. The memory device 522 contains parameters that are representative of the default color space. The unit 508 causes the default parameters in the memory device 522 to be transferred to the process unit 510. As an example, the default color space can be sRGB.

As a further alternative, instead of the tag data (representative of parameters of a color space) being transmitted to the unit 508 via the signal path 210, the parameters themselves for the color space could be transmitted to the unit 508 from the data image provider 502. But this alternative will consumer a greater communication bandwidth.

In FIG. 3, the CS1 image data and associated tag data are transmitted by the image provider 300 over the signal paths 208 and 210, respectively, from the server 304 via the network 302. The output device 306 is capable of interfacing to the network 302. The operation of the CS conversion module 204, etc., remains substantially the same.

In FIG. 4, the data provider 406 transmits CS1 image data and its associated tag data over wireless signal paths 414 and 416, respectively, to the antenna 401 under control of the server 410 via the wireless network 408. The wireless interface 402 of the computing device 400 receives the CS1 image data and its associated tag data via the signal paths 418 and 420, respectively. The wireless interface 402 transfers the CS1 image data and its associated tag data to the CPU 404 via the signal paths 418 and 420, respectively. The CPU 404 transfers the CS1 image data and its associated tag data via the signal paths 208 and 210, respectively, to the CS conversion module 204 within the output device 206. Again, the operation of the CS conversion module 204, etc., remains substantially the same.

In FIG. 6, the image data provider 600, e.g., the memory device 602, provides image data based in a first color space (CS1) and tag data representing parameters of the first color space via signal paths 110 and 112, respectively, to the CPU 202 of the PC 200. The operation of the CPU 202, etc., remains substantially the same as in FIG. 2.

Some advantages of the invention will be discussed. By moving the CS conversion module to the output device, the invention relieves the CPU of the burden of having to convert image data of a first color space into a second color space. This makes it possible for computing devices equipped with this technology to display moving pictures that, by contrast, cannot be displayed according to the Background Art. And by making the conversion automatic by way of passing the tag data to the CS conversion unit, the invention relieves the viewer/user of having to optimize the settings of the output device each time the color space of the inputted image data changes.

Further, by having the CS conversion modules moved to the output devices, a computing device according to the invention can drive multiple output devices (that are designed to different color spaces) concurrently. And the multiple output devices can convert the image data into visually perceptible analogs thereof concurrently in real time.

The invention achieves output device independence for the CPU. In other words, the transfer of image data by a CPU to an output device can take place in an object-oriented manner, i.e., without the need for the CPU to adapt the image data to particularities of the output device. Conversely, output devices according to the invention achieve image data source independence, i.e., the output device can display image data from any color space (defined for the output device in advance) without the need to receive image data converted to the color space of the output device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of displaying original image data that was generated relative to a first color space by an output device that converts image data of a second color space to a visually-perceptible analog thereof, the method comprising:

receiving from a provider, over a communication channel, original image data that was generated according to a first color space;

receiving from said provider, over a communication channel along with said image data, tag data representing parameters of said first color space;

said output device automatically converting said original image data into said second color space according to said tag data to produce converted image data; and said output device converting said converted image data into a visually-perceptible analog thereof, wherein said output device is a monitor, a projector or a printer, and wherein the conversion of said original image data into said second color space is performed solely by said monitor, said projector, or said printer.

2. The method of claim 1, wherein said provider is a computing device and said communication channel is a direct connection between said computing device and said output device, or wherein said provider is a memory device and said communication channel is a direct connection between said memory device and said output device; or wherein said provider is a server and said communication channel is a network to which said output device is connected.

3. The method of claim 1, wherein said output device is a component of a personal computing device connected to said network.

4. The method of claim 3, wherein said network connection is wireless.

5. The method of claim 1, wherein said provider receives said original image data from a source.

6. The method of claim 5, wherein said source is a scanner, a digital camera or a signal generator.

7. The method of claim 1, wherein said tag data include a code identifying a color space, primary coordinates, tone characteristics, color representation characteristics, or parameters for image processing.

8. The method of claim 7, wherein said tag data are a combination of said primary coordinates and said tone characteristics, or wherein said tone characteristics include a gamma value for said first color space and table values for tone conversion, or said color reproduction characteristics include one of RGB signal levels for specific colors or a combination of hue, chroma and value coordinates.

9. The method of claim 8, wherein said hue, chroma and value coordinates are expressed in absolute magnitudes or relative magnitudes.

10. A method of displaying original image data that was generated relative to a first color space by an output device that converts image data of a second color space to a visually-perceptible analog thereof, the method comprising:

receiving from a provider, over a communication channel, original image data that was generated according to a first color space;

monitoring the presence of tag data, representing parameters of a color space, over said communication channel along with said image data;

presuming, if no tag data is received over said communication channel, that said first color space is a default color space;

said output device converting said original image data into said second color space based upon the presumption that said first color space is said default color space to produce converted image data; and said output device converting said converted image data into a visually-perceptible analog thereof, wherein said output device is a monitor, a projector or a printer, and wherein the conversion of said original image data into said second color space is performed solely by said monitor, said projector, or said printer.

11. The method of claim 10, wherein said provider is a computing device and said communication channel is a direct connection between said computing device and said output device, or wherein said provider is a memory device and said communication channel is a direct connection between said memory device and said output device, or wherein said provider is a server and said communication channel is a network to which said output device is connected.

12. The method of claim 10, wherein said output device is a component of a personal computing device connected to said network.

13. The method of claim 12, wherein said network connection is wireless.

14. The method of claim 10, wherein said provider receives said original image data from a source.

15. The method of claim 14, wherein said source is a scanner, a digital camera or a signal generator.

16. The method of claim 10, wherein said default color space is standard RGB (sRGB).

17. The method of claim 10, further comprising:
said output device retrieving data representing parameters of said default color pace, wherein said parameters include:
a code identifying a color space,
primary coordinates,
tone characteristics,
color representation characteristics, or
parameters for image processing.

18. The method of claim 17, wherein said parameters are a combination of said primary coordinates and said tone characteristics, or wherein said tone characteristics include a gamma value for said first color space and table values for tone conversion, or said color reproduction characteristics include one of RGB signal levels for specific colors or a combination of hue, chroma and value coordinates.

19. The method of claim 18, wherein said hue, chroma and value coordinates are expressed in absolute magnitudes or relative magnitudes.

20. A computing system, having an output device that converts image data of a second color space to a visually-perceptible analog of said image data, to display original image data that was generated relative to a first color space, the apparatus comprising:
a provider of image data;
a communication channel; and
an output device that converts image data of a second color space to a visually-perceptible analog thereof;
said output device being operable to receive said original image data, that was generated according to a first color space, from said provider over said communication channel;

said output device being operable to receive, along with said image data, tag data representing parameters of said first color space from said provider over said communication channel;

said output device being operable to convert said original image data relative to said second color space according to said tag data to produce converted image data; and said output device being operable to convert said converted image data into a visually-perceptible analog thereof, wherein said output device is a monitor, a projector or a printer, and wherein the conversion of said original image data to said converted image data is performed solely by said monitor, said projector, or said printer.

21. The computing system of claim 20, wherein said provider is a computing device and said communication channel is a direct connection between said computing device and said output device, or wherein said provider is a memory device and said communication channel is a direct connection between said memory device and said output device; or wherein said provider is a server and said communication channel is a network to which said output device is connected.

22. The computing system of claim 20, wherein said output device is a component of a personal computing device connected to said network.

23. The computing system of claim 22, wherein said network connection is wireless.

24. The computing system of claim 20, wherein said provider receives said original image data from a source.

25. The computing system of claim 24, wherein said source is a scanner, a digital camera or a signal generator.

26. The computing system of claim 20, wherein said output device is a first output device and said converted image data is first converted image data, the computing system having at least a second output device that converts image data of a third color space to a visually-perceptible analog of said image data; and wherein
said provider is operable to transmit said original image data to said second output device;
said provider is operable to transmit said tag data along with said original image data to said second output device; and
said second output device is operable to convert said original image data relative to said third color space according to said tag data to produce second converted image data; and
said second output device is operable to convert said second converted image data into a visually-perceptible analog substantially simultaneously with said first output device converting said first converted image data into a visually-perceptible analog thereof.

27. The computing system of claim 26, wherein said first device is a default monitor for said computing system and said second device is an auxiliary monitor.

28. The computing system of claim 27, wherein said auxiliary monitor is a projector device.

29. A computing system, having an output device that converts image data of a second color space to a visually-perceptible analog of said image data, to display original image data that was generated relative to a first color space, the apparatus comprising:
a provider of image data;
a communication channel; and an output device that converts image data of a second color space to a visually-perceptible analog thereof;

said output device being operable to receive said original image data, that was generated according to a first color space, from said provider over said communication channel;

said output device being operable to monitor the presence of tag data, representing parameters of a color space, over said communication channel along with said image data;

said output device being operable to presume, if no tag data is received over said communication channel, said first color space as being a default color space;

said output device being operable to convert said original image data relative to said second color space based upon the presumption that said first color space is said default color space to produce converted image data; and said output device being operable to convert said converted image data into a visually-perceptible analog thereof, wherein said output device is a monitor, a projector or a printer, and wherein the conversion of said original image data to said converted image data is performed solely by said monitor, said projector, or said printer.

30. The computing system of claim 29, wherein said provider is a computing device and said communication channel is a direct connection between said computing device and said output device, or wherein said provider is a memory device and said communication channel is a direct connection between said memory device and said output device; or wherein said provider is a server and said communication channel is a network to which said output device is connected.

31. The computing system of claim 29, wherein said output device is a component of a personal computing device connected to said network.

32. The computing system of claim 31, wherein said network connection is wireless.

33. The computing system of claim 29, wherein said provider receives said original image data from a source.

34. The computing system of claim 33, wherein said source is a scanner, a digital camera or a signal generator.

35. The computing system of claim 29, wherein said output device is a first output device and said converted image data is first converted image data, the computing system having at least a second output device that converts image data of a third color space to a visually-perceptible analog of said image data; and wherein said provider is operable to transmit said original image data to said second output device;

said provider is operable to transmit said tag data along with said original image data to said second output device; and said second output device is operable to convert said original image data relative to said third color space according to said tag data to produce second converted image data; and said second output device is operable to convert said second converted image data into a visually-perceptible analog substantially simultaneously with said first output device converting said first converted image data into a visually-perceptible analog thereof.

36. The computing system of claim 35, wherein said first device is a default monitor for said computing system and said second device is an auxiliary monitor.

37. The computing system of claim 35, wherein said auxiliary monitor is a projector device.

38. The computing system of claim 29, wherein said default color space is standard RGB (sRGB).

39. An image display apparatus comprising:

an input terminal for receiving from a provider, over a communication channel, original image data that was generated according to a first color space and for receiving tag data representing parameters of the first color space; and a color conversion module for converting the original image data from the first color space into a second color space on the basis of the tag data, wherein the image display apparatus, visually displays the converted image data, wherein the image display apparatus is a liquid crystal display device, a plasma display device, a projector, or a printer, and wherein the conversion of the original image from the first color space into the second color space is performed solely by the liquid crystal display device, the plasma display device, the projector, or the printer.

40. The image display apparatus according to claim 39, wherein a plurality of image display apparatuses receive the original image data and the tag data from the provider.

\* \* \* \* \*